United States Patent
Hill

(12) 
(10) Patent No.: US 6,182,652 B1
(45) Date of Patent: Feb. 6, 2001

(54) HEATING SYSTEM VALVE FOR A WIND MACHINE

(75) Inventor: Daryl G. Hill, Yakima, WA (US)

(73) Assignee: Orchard-Rite Ltd., Inc., Yakima, WA (US)

(*) Notice: Under 35 U.S.C. 154(b), the term of this patent shall be extended for 0 days.

(21) Appl. No.: 09/515,587

(22) Filed: Feb. 29, 2000

(51) Int. Cl.[7] .................................................. A01G 13/06
(52) U.S. Cl. ................................................. 126/59.5; 47/2
(58) Field of Search ........................... 126/59.5, 110 D, 126/110 B; 431/183, 350, 353, 354; 47/2; 416/95, 90 R

(56) References Cited

U.S. PATENT DOCUMENTS

| | | | |
|---|---|---|---|
| 2,848,816 | * | 8/1958 | Maloof ..................................... 47/2 |
| 2,895,259 | * | 7/1959 | Beckett ................................. 126/59.5 |
| 3,067,541 | * | 12/1962 | Smith ........................................ 47/2 |
| 3,296,738 | * | 1/1967 | Wiegel ...................................... 47/2 |
| 3,377,743 | * | 4/1968 | Thompson et al. .................. 126/59.5 |
| 5,244,346 | * | 9/1993 | Fergusson ............................ 416/142 |

\* cited by examiner

*Primary Examiner*—James C. Yeung
(74) *Attorney, Agent, or Firm*—Stratton Ballew PLLC

(57) ABSTRACT

A heater apparatus for a wind machine and particularly for heating a wind stream generated by the wind machine, the wind machine rotatably mounted upon a central tower. The generated air stream can be directed toward a target such as an orchard, vineyard or crop. The wind machine rotates upon a pinion attached to the wind machine. The pinion rotates within a housing, and the housing is immovably mounted to the central tower. The housing includes a pinion cavity, which receives the pinion. The pinion is rotatable within the housing, and the pinion is co-rotatable with the wind machine about a common axis of rotation upon the central tower. A manifold is formed within the pinion cavity, between the pinion and the housing and is further bounded by an upper seal and a lower seal. A fuel is receivable into the manifold, the fuel conducted into the manifold through a housing port. The housing port penetrates through the housing and is open to the manifold. The housing port conducts the fuel into the manifold. A pinion port that passes through the pinion conducts the fuel out of the manifold and to a burner mounted proximate the wind machine. The burner combusts the fuel to heat the wind stream.

6 Claims, 8 Drawing Sheets

HEATING SYSTEM VALVE FOR A WIND MACHINE

TECHNICAL FIELD

The invention relates to a heating system for a tower mounted wind machine and more particularly to an apparatus for delivering a combustible fuel to a burner, the burner rotatably mounted on the tower, in the air stream of the wind machine.

BACKGROUND OF THE INVENTION

Wind machines are widely used in agricultural applications, often to prevent springtime frost damage to a crop by circulating the air near the crop. To supplement the circulation of air with a direct heating of the air, the wind machines have been fitted with heaters.

Prior wind machine devices with heating features include U.S. Pat. No. 3,067,541, to Smith, which includes heater fuel combustion along the trailing edges of the wind machine's propeller blades. To deliver the fuel into the rotating propeller, a concentric set of tubing is employed within a rotary joint. The tubing set includes a stationary pipe received within a rotating pipe. O-ring seals are positioned within the overlapping flared and butted portions of the pipes, within the rotary joint, as detailed in FIG. 6, therein. A significant problem with this central rotary joint is that it cannot be applied to a conventional wind machine. The Smith '541 apparatus does not require a drive shaft and so the central, rotary joint can occupy this axial position. However, the drive shaft for the conventional wind machine's propeller is typically positioned in the rotational center of the wind machine's connection to the tower.

Another heating wind machine is found in U.S. Pat. No. 3,296,739 to Wiegel, which discloses a burner mounted near the hub of the propeller. A rotary connection supplies fuel through the rotating, upper section of the fan. The rotary connection of Wiegel '739 is detailed in FIG. 4, therein. The connection includes a hollow sleeve that couples to a fuel supply pipe. The hollow sleeve conducts the fuel into the upper section where it communicates with a lateral passage. An O-ring between the hollow sleeve and an upper joint section establishes a fluid tight seal. The wind machine rotates on the tower or support about a vertical axis. The Wiegel rotary connection is a simple pipe connection and so must be positioned at the bulls-eye center of the wind machine's vertical axis of rotation. Weigel provides a source of mechanical power for the wind machine on the rotating, upper portion of the wind machine and so avoids the need for a drive shaft that extends upward, along the rotational axis of the support. A rotatable connection for delivering liquids and fuels for a tower mounted wind machine is needed that does not require location at the center of the wind machine's vertical axis of rotation.

SUMMARY OF INVENTION

The present invention provides a heater apparatus for a wind machine and particularly for heating a wind stream generated by the wind machine. The wind machine is rotatably mounted upon a central tower and generates the wind stream by the rotation of a propeller. The wind stream can be directed toward a target such as an orchard, vineyard or crop.

The heater apparatus includes a central tower that also receives the wind machine. The wind machine is set on the top of and rotes on the central tower. The rotation is accomplished by a pinion attached to the wind machine. The pinion rotates within a housing, and the housing is immovably mounted to the central tower. The housing includes a pinion cavity, which receives the pinion. The pinion is rotatable within the housing, and the pinion is co-rotatable with the wind machine about a common axis of rotation upon the central tower.

According to an aspect of the invention, the heater apparatus also includes a manifold formed in the pinion cavity. Specifically, the manifold is formed within the pinion cavity, between the pinion and the housing. The manifold is further bounded by an upper seal and a lower seal. A fuel is received into the manifold. The fuel is conducted into the manifold through a housing port. The housing port penetrates through the housing. The housing port has a housing port outlet at the pinion cavity. The housing port outlet is open to the manifold The housing port also has a housing port inlet at an exterior surface of the housing. The housing port inlet receives the fuel into the housing port. A pinion port passes through the pinion. The pinion port has a pinion port inlet at the pinion cavity, and a pinion port outlet at an exterior surface of the pinion. The pinion port inlet receives the fuel from the manifold and conducts the fuel to the pinion port outlet. A burner mounts proximate the wind machine. The burner combusts the fuel, received from the pinion port outlet. The fuel is combusted to heat the wind stream.

The present invention has the advantage of providing a heater apparatus for a wind machine that includes a fully rotational and substantially leak proof manifold, which conducts a steady flow of fuel to a burner. Still further aspects and advantages of the invention will become apparent from consideration of the following figures and description.

DETAILED DESCRIPTION OF SPECIFIC EMBODIMENTS

The present invention is embodied in an apparatus as shown in FIGS. 1 through 8. The invention provides a heater apparatus 12 for a wind machine 14. The wind machines that can employ the present invention are used to service orchards and crops primarily for freeze protection.

Figure 1:
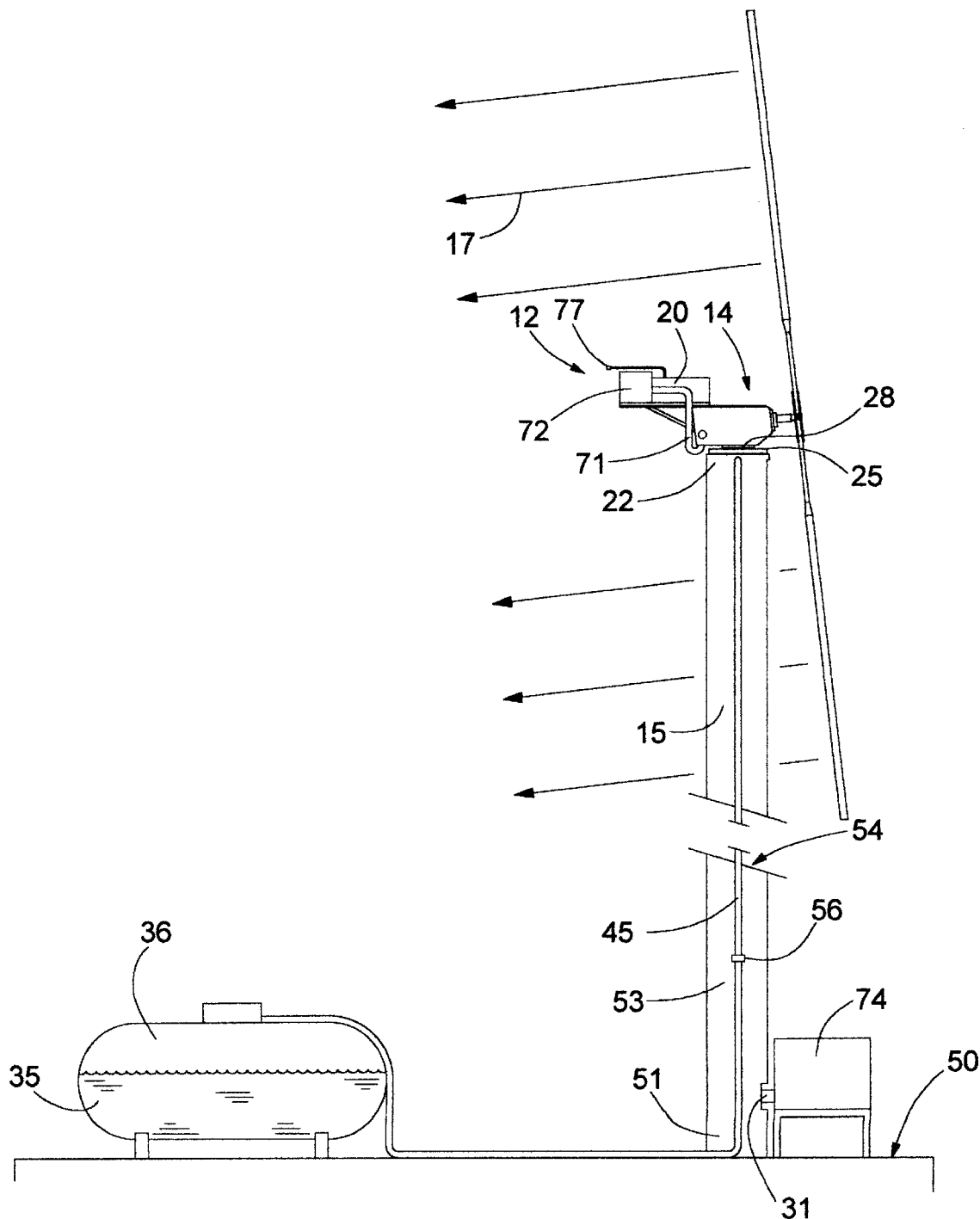
FIG. 1 is a side view of a heating system for a wind machine, according to an embodiment of the invention.

Additionally, these wind machines can be used for humidifying the air surrounding the orchards and crops, and sometimes also for dispersing agricultural chemicals. FIG. 1 details a preferred embodiment of the present invention that serves a typical wind machine 1Z, which is rotatably mounted upon a central tower 15. These conventional wind machines all generate a wind stream 17. The wind stream is an air stream, typically generated by the rotation of a propeller 18. Alternatively the wind stream can be generated by any similarly acting device, such as a fan or a turbine, which produces a directional stream of air in a sufficient quantity for the purposes of the present invention. For the present invention, the wind stream is most preferably directed as shown in FIG. 1, with the wind stream moving toward a burner 20 that is preferably mounted close to the wind machine, also on the central tower.

Figure 2:
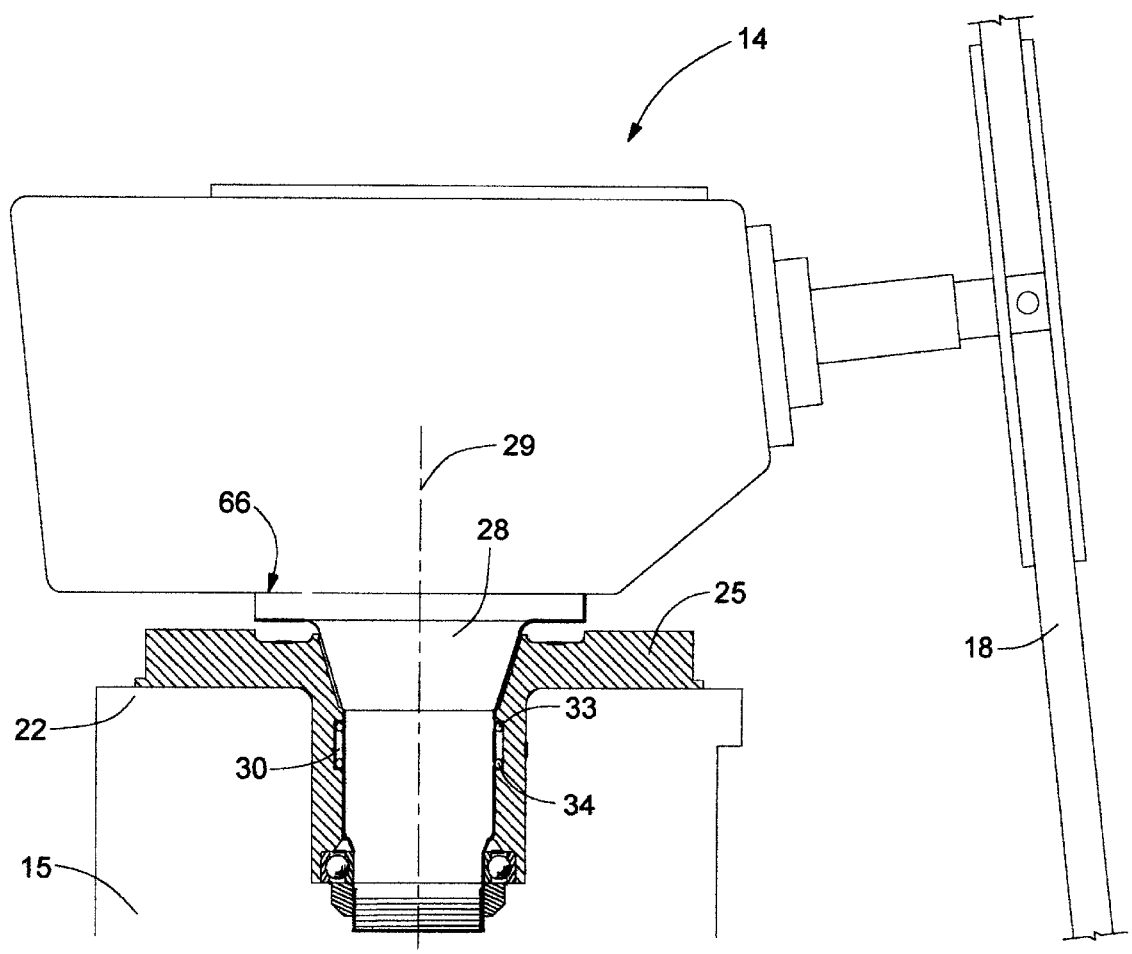
FIG. 2 is a side view of a partially sectioned portion of a heating system for a wind machine, according to an embodiment of the invention.
Figure 6:
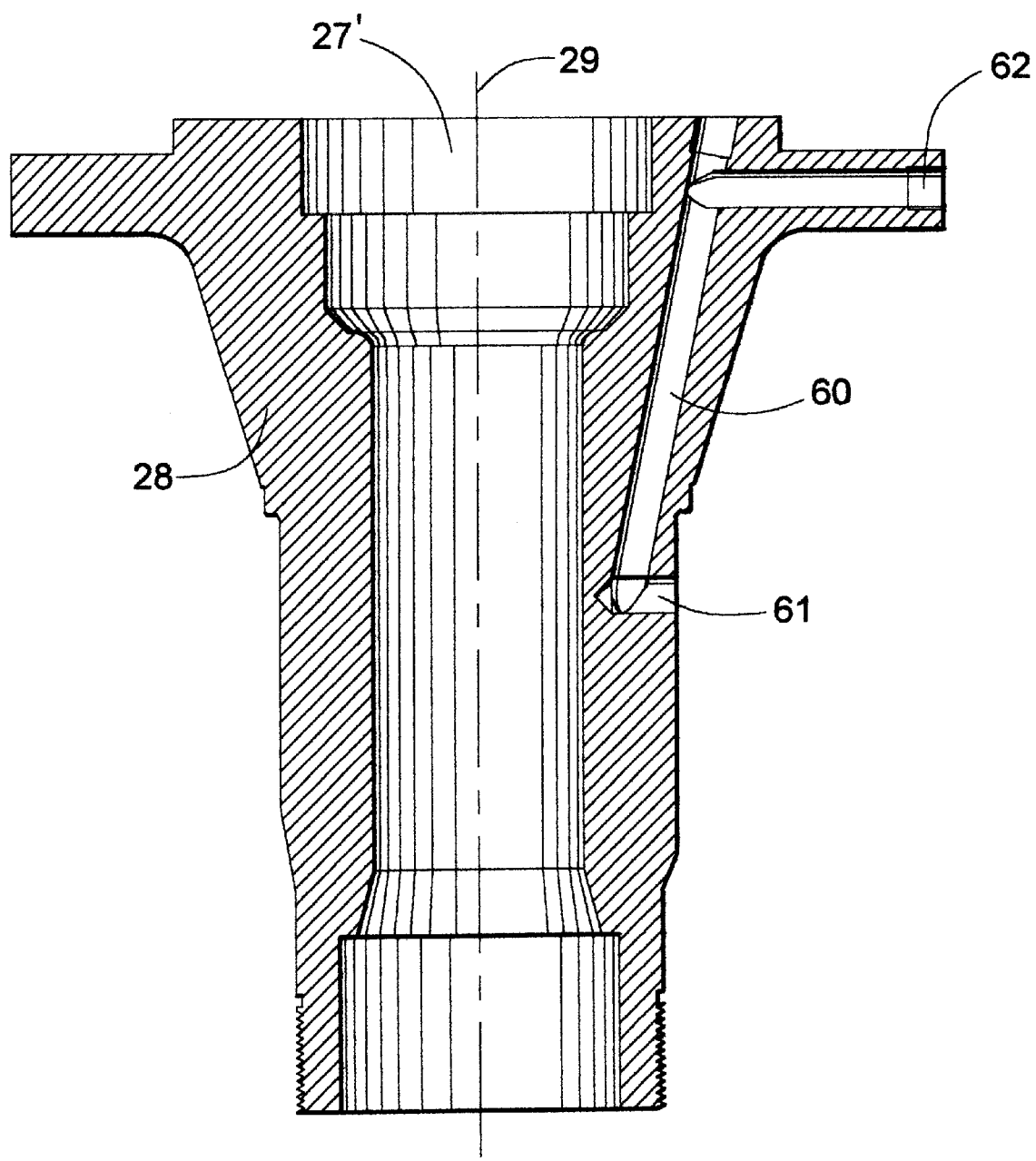
FIG. 6 is a sectioned view of a pinion of a heating system for a wind machine, according to an embodiment of the invention.

The central tower 15 of the wind machine 14 has a top 22. As shown in FIGS. 1 and 2, a housing 25 is mounted to the central tower, proximate the top of the central tower. The housing, as shown in cross-section in FIG. 2 and 5, includes a pinion cavity 27 formed within the housing. The housing is preferably cast from an appropriate stainless steel alloy, into which the pinion cavity of the housing is exactly milled to receive a pinion 28. The pinion, as shown in FIG. 2 and shown in cross-section in FIG. 6, is most preferably cast from a similar alloy to the housing, and then milled to precise dimensions, as required The pinion immovably mounts to the wind machine and is receivable into the housing, as shown in FIG. 2, and is shown in cross-section in FIG. 3. The pinion is rotatable within the housing. Because the pinion is immovably mounted to the wind machine, the pinion is co-rotatable with the wind machine about a common axis of rotation 29 upon the central tower, as shown in FIG. 2.

Figure 7:
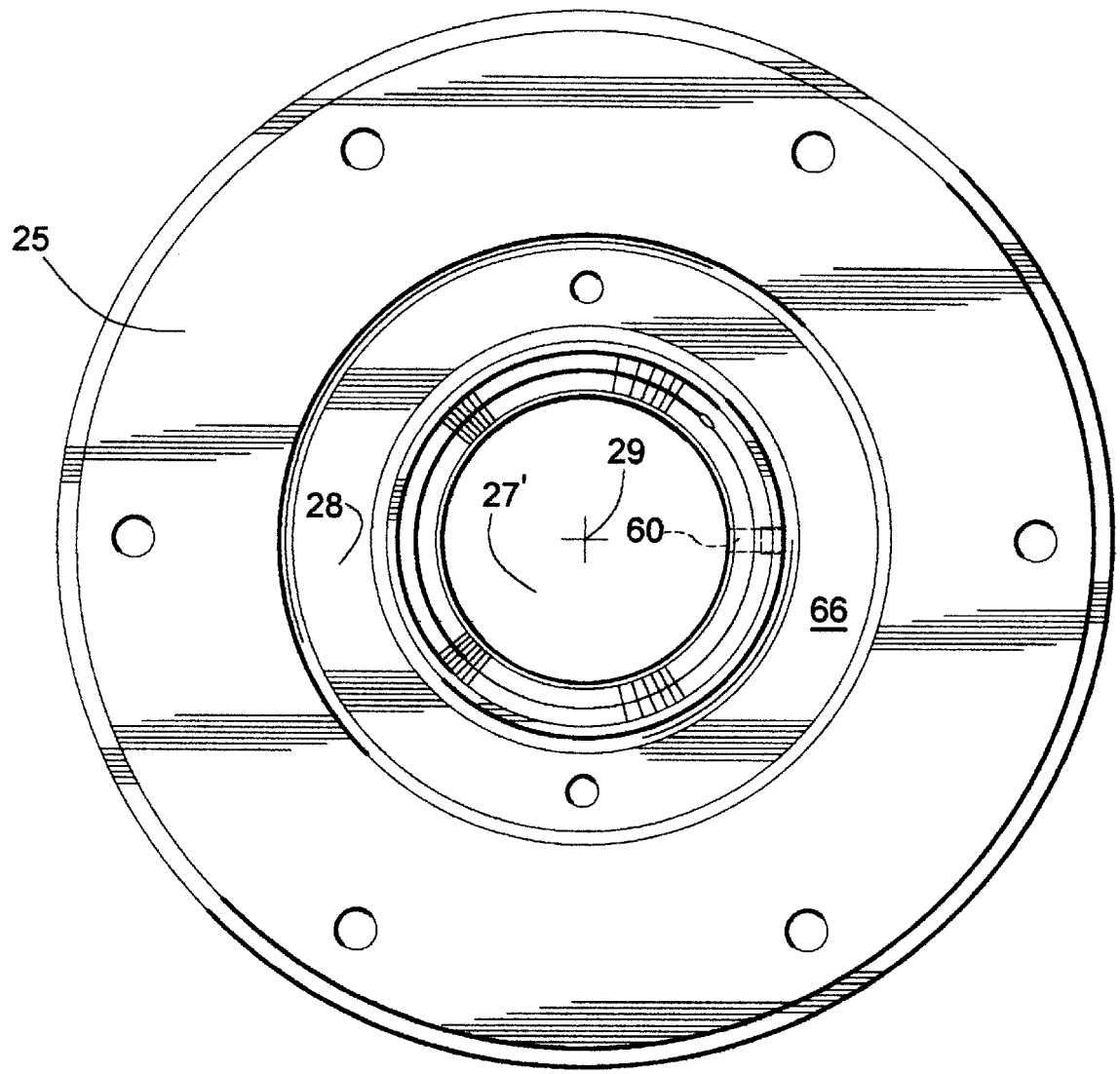
FIG. 7 is a top view of a housing and a pinion of a heating system for a wind machine, according to an embodiment of the invention.

FIG. 7 shows the housing 25 surrounding the pinion 28. From this plan view, the common axis of rotation 29 is at the center the pinion cavity 27, shown as a pinion drive cavity 27'. The pinion cavity is the cavity within the pinion, which is shown as an empty space, receives the drive shaft 31 for the wind machine 14.

Figure 3:
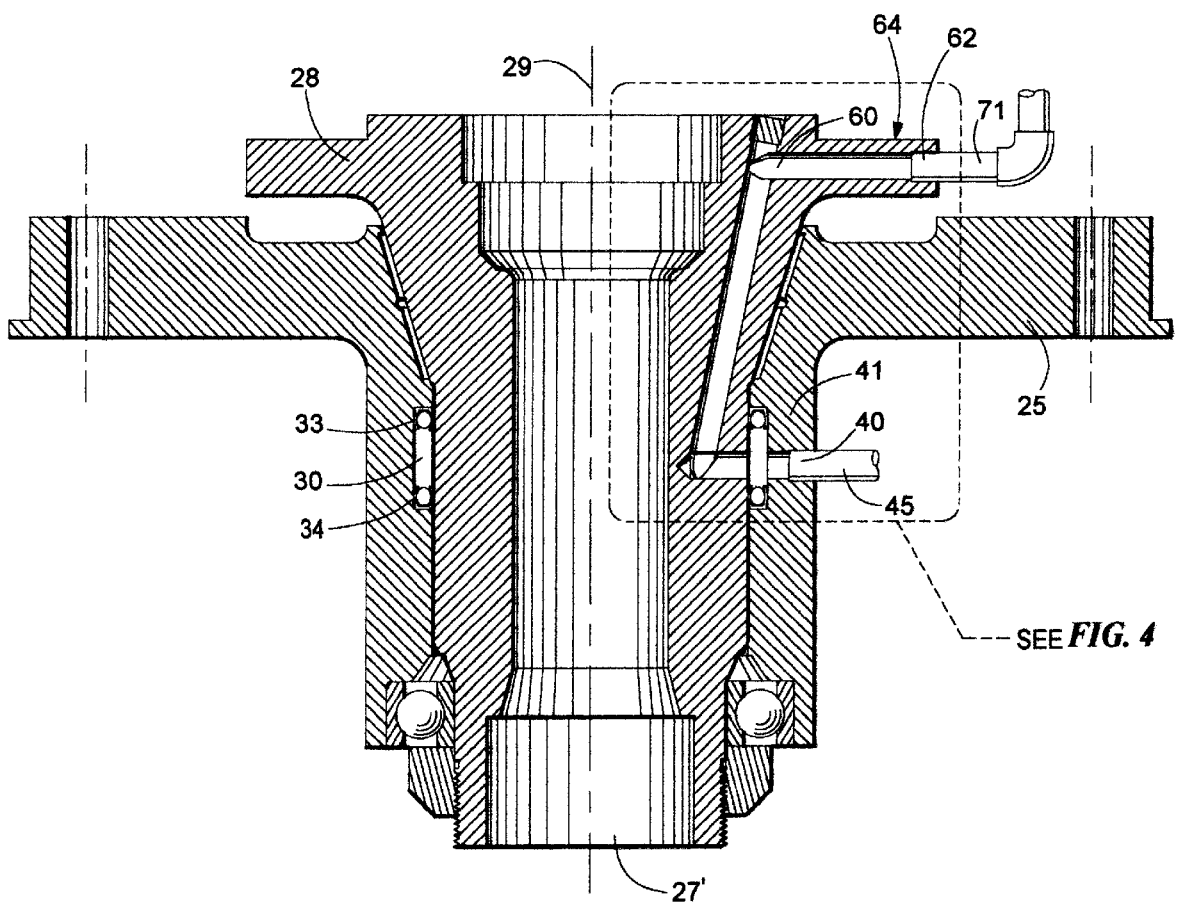
FIG. 3 is a sectioned view of a housing and a pinion of a heating system for a wind machine, according to an embodiment of the invention.

FIG. 3 shows a manifold 30 formed in the pinion cavity 27. The manifold is formed between the pinion 28 and the housing 25. The manifold completely encircles the pinion, and so the manifold acts as a small plenum for a fuel 35. To prevent the fuel from escaping, the manifold is bounded on the top and bottom by an upper seal 33 and a lower seal 34, respectively, as further detailed in FIG. 4.

The fuel 35 received into the manifold 30 is for combustion within the burner 20 positioned on the central tower 15, above. Preferably, the fuel is a light hydrocarbon, such as a typical natural gas product. Butane, propane, and methane each perform well for the present invention. The fuel can be stored in a tank 36, near the central tower, as shown in FIG. 1. More preferably, the light hydrocarbon fuel is used by the heater apparatus 12 in a vaporized form, rather than in a pressurized, liquid state. The fuel is most preferably received into the manifold at an approximately ambient temperature. In extreme environments, the fuel can be heated or cooled as required to maintain satisfactory fuel flow. As an alternative, the fuel can be in a liquified state and still utilized by the heater apparatus of the present invention.

The upper seal 33 and lower seal 34 are selected to prevent leakage of the fuel 35 out of the manifold 30, over a wide range of possible fuel types, and over a wide range of operational temperatures and pressures. A preferred seal for use as the upper seal and the lower seal can be a typical O-ring. An O-ring is a ring-shaped device formed from a flexible material to provide a seal between two solid, abutting cylindrical parts. The upper seal and the lower seal are shown in a detailed cross section in FIG. 4. Most preferably, as shown, a "Series 103 Omniseal™" flexible supporting spring seal, as manufactured by Furon Mechanical Seals, of Los Alamitos, Calif., USA is utilized to prevent leakage out of the manifold 30 during operation of the heater apparatus 12.

Alternatively, a wear sleeve can be mounted on the pinion 28 to provide the upper seal 33 and the lower seal 34 with a wear resistant sealing surface. An additional feature of the wear sleeve is that it can be inexpensively replaced if worn or periodically replaced as part of a failure preventative schedule of maintenance. The wear sleeve can be made from a hardened or annealed carbon steel alloy.

Figure 4:
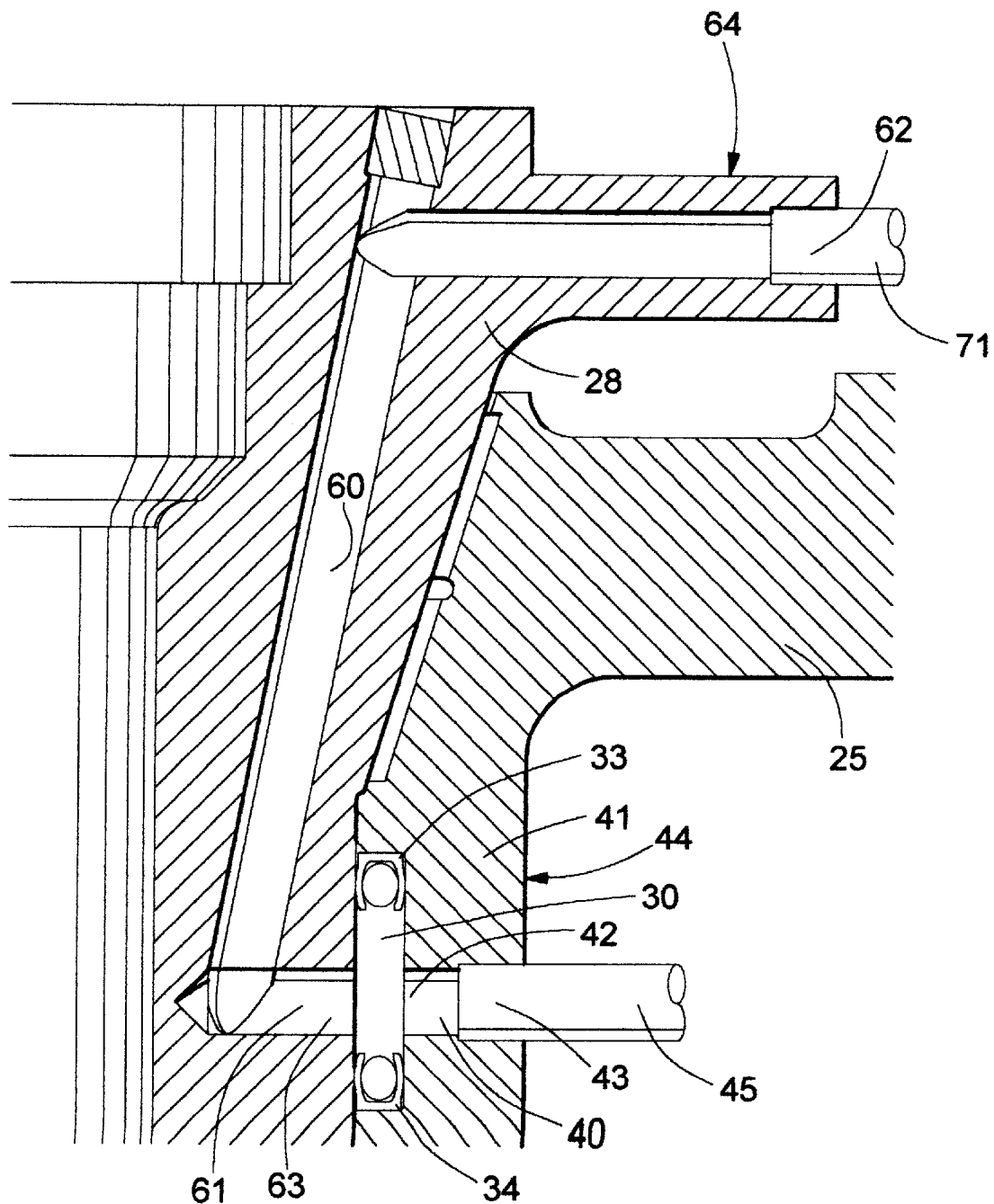
FIG. 4 is a sectioned detail view from FIG. 3, of a housing and a pinion of a heating system for a wind machine, according to an embodiment of the invention.
Figure 5:
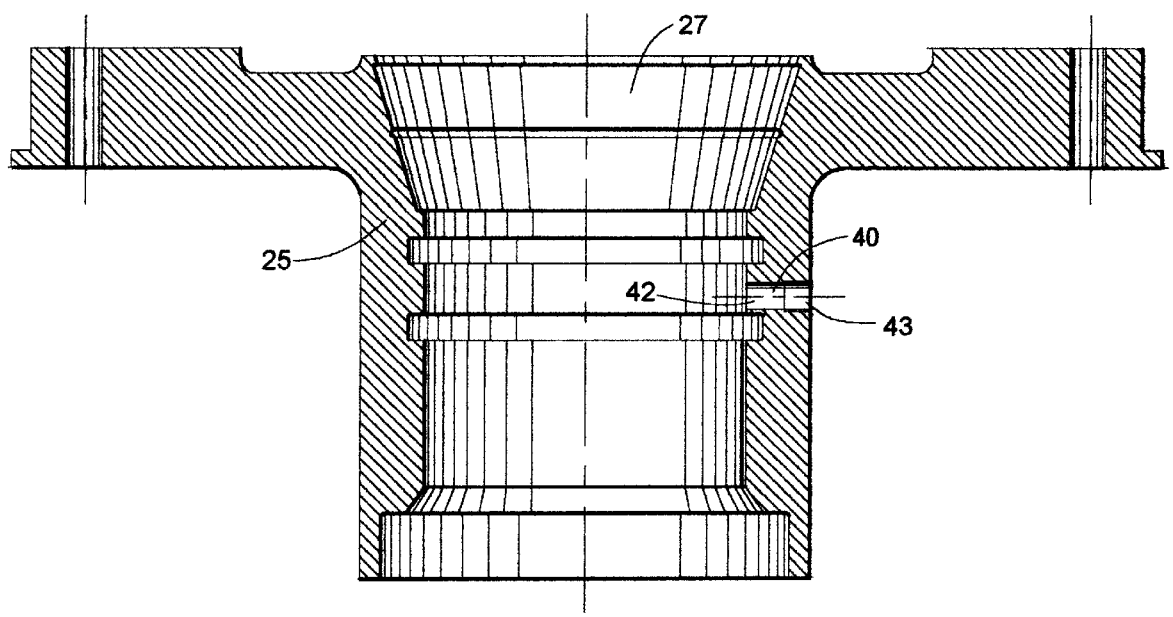
FIG. 5 is a sectioned view of a housing of a heating system for a wind machine, according to an embodiment of the invention.

As also shown in FIG. 2, 3, and 4, a housing port 40 penetrates through a pinion cavity wall 41 of the housing 25. The housing port conducts the fuel 35 into the manifold 30, as detailed in FIG. 4. The housing port has a housing port outlet 42 at the pinion cavity 27 of the housing, which is open to the manifold. The housing port also has a housing port inlet 43 at an exterior surface 44 of the pinion cavity wall of the housing.

The housing port inlet 43 receives the fuel 35 into the housing port 40. The fuel is preferably conducted to the housing port inlet with a tower fuel conduit 45, as shown in FIG. 1. The central tower supports the tower fuel conduit. The tower fuel conduit can run on an exterior surface 53 of the central tower or within an interior 54 of the central tower, as preferred. The central tower 15 is mounted to a ground surface 50 at a tower base 51. Most preferably, the fuel is stored in a tank 36, located proximate the tower base of the central tower, to which the tower fuel conduit can be connected However, the tower fuel conduit can alternatively be connected directly to a fuel supply network, such as a natural gas supply grid. The tower fuel conduit preferably also includes a regulator 56, for reducing the pressure of the fuel from a near liquified state to a gas at near ambient pressure, which is better suited for the heater apparatus 12 of the present invention.

A pinion port 60 through the pinion 28 conducts the fuel 35 out of the manifold 30, as detailed in FIG. 4. The pinion port has a pinion port inlet 61 at the pinion cavity 27 of the housing 25 and a pinion port outlet 62. The pinion port inlet can penetrate through the wear sleeve (not shown) to communicate with the manifold 30. If utilized, the wear sleeve can include a wear sleeve port to allow the fuel to pass through to the pinion port inlet. The pinion port outlet is located at a top surface 64 of the pinion 28. The top surface of the pinion is preferably abutted to a wind machine mount 66 of the wind machine 14, as detailed in FIG. 2. The top surface of the pinion is exterior to the pinion and outside the housing 25.

The pinion port inlet 61 receives the fuel 35 from the manifold 30 and the pinion port 60 then conducts the fuel through the pinion 28 to the pinion port outlet 62. A burner 20, mounted proximate the wind machine 14, combusts the fuel received from the pinion port outlet. A wind machine fuel conduit 71, as shown in FIG. 1, routes the fuel from the pinion port outlet to the burner. FIGS. 3 and 4 show the connection of the fuel conduit to the pinion port outlet. Preferably, the burner also includes a preheating coil 72, in which the fuel is heated by the burner before feeding the fuel into the burner, as detailed in FIG. 11. The combustion of the fuel heats the wind stream 17. The burner preferably rotates with the wind machine, about the common axis of rotation 29, so that a flame 73 from the combusted fuel tracks with the wind stream generated by the wind machine.

The propeller 18 of the wind machine 14 is rotated by a drive shaft 31 that is turned by an engine 74. The engine, as shown in FIG. 2 within its housing, is preferably positioned near the tower base 51 of the central tower 15. The shaft exits the engine to transition up the length of the central tower, through the pinion drive cavity 27' and into the wind machine. Within the wind machine, the shaft again transitions to drive the propeller. Additional gearing and transmissions can also be included as required to rotate the propeller at a desired speed.

As a preferred alternative, the heater apparatus 12 of the present invention can be utilized in agricultural heating applications. In such an embodiment, the target of the wind stream 17 is an orchard or crop growing area Other applications for the heater apparatus are (considered wherever a liquid or gas needs to be supplied to a rotatable air moving device, such as the wind machine 14, and especially when it is undesirable to route the liquid or gas directly through the air moving device's axis of rotation.

Figure 8:
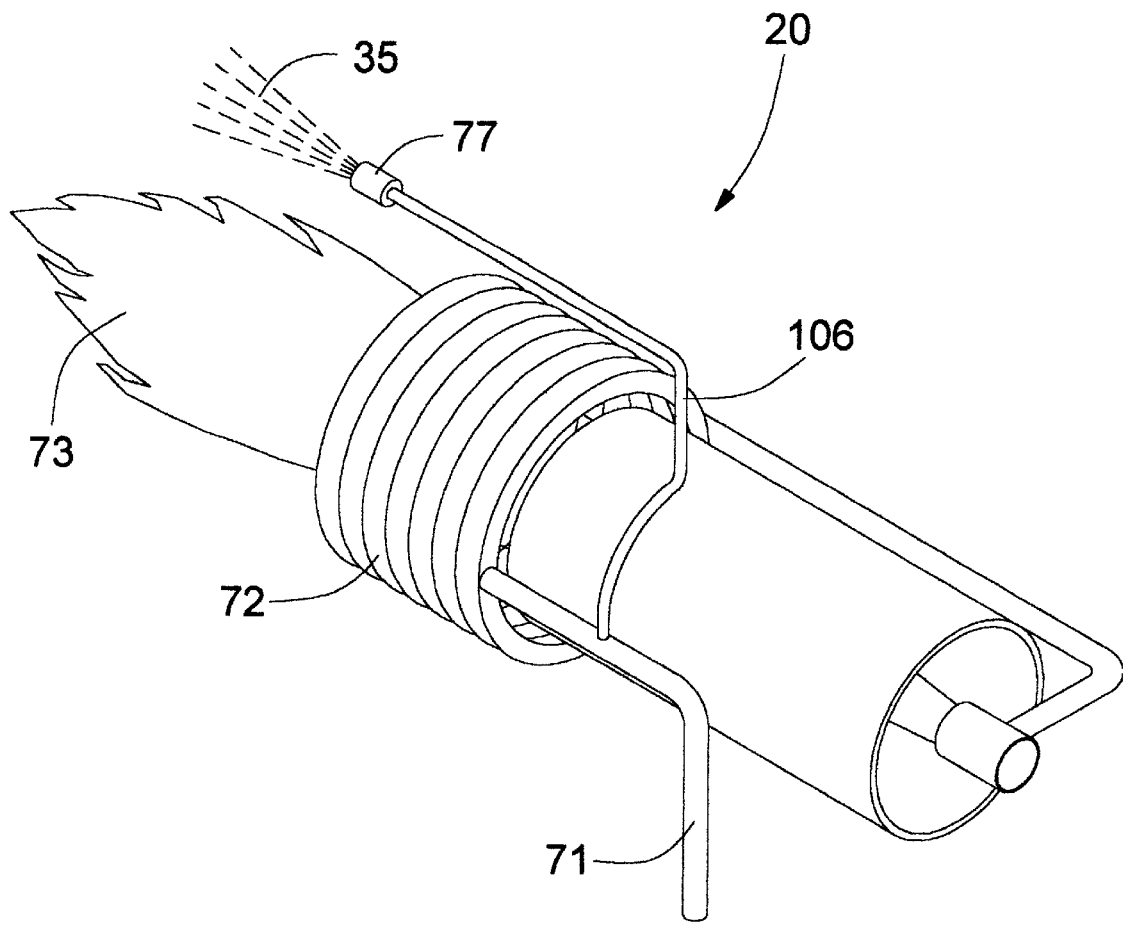
FIG. 8 is a perspective view of a burner of a heating system, according to an embodiment of the invention.

As shown in FIG. 8, the burner 20 can also include an ignition burner 77. The ignition burner receives the fuel 35, as shown emitting from the ignition burner. The fuel is piped to the ignition burner and ignited by an electronic igniter to "fire off" the burner. Alternatively, the fuel fed to the ignition burner can be a specific mixture of the fuel 35 and air to form an ignition mixture that is easily combusted. The fuel for the ignition mixture can be mixed with a source of combustion air, within a conventional carburetor device before flowing through the manifold 30 or after passing through the manifold.

Also alternatively, the fuel 35 for the ignition mixture can be routed from the tank 36, through the housing 25 and the pinion 28, in an essentially parallel system that is similar to the manifold formed to rout the fuel 35 to the burner 20. The igniter 77, as shown in FIG. 8. is mounted proximate the burner 20 of the wind machine 14. The igniter sparks the fuel and air mixture that is received from the pinion port outlet 62. An igniter fuel conduit 106, routes, the fuel from the pinion port outlet to the igniter.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited but by the following claims, as appropriately interpreted by the doctrine of equivalents.

The following is claimed:

1. A heater apparatus for a wind machine comprising:
   a central tower having a top, the central tower for receiving a wind machine, and the wind machine for generating an air stream;
   a housing immovably mounted to the central tower proximate the top of the central tower, the housing including a pinion cavity, and the wind machine rotatably mounted to the top of the housing;
   a pinion received into the pinion cavity of the housing, the pinion rotatable within the housing, and the pinion co-rotatable with the wind machine about a common axis of rotation upon the central tower;
   a manifold formed in the pinion cavity, the manifold formed between the pinion and the housing, and the manifold further bounded by an upper seal and a lower seal;
   a fuel receivable into the manifold;
   a housing port through the housing, the housing port for conducting the fuel into the manifold, the housing port having a housing port outlet at the pinion cavity of the housing, the housing port open to the manifold, and the housing port having a housing port inlet at an exterior surface of the housing, the housing port inlet for receiving the fuel into the housing port;
   a pinion port through the pinion, the pinion port having a pinion port inlet at the pinion cavity of the housing and a pinion port outlet at an exterior surface of the pinion, and the pinion port inlet for receiving the fuel from the manifold and the pinion port for conducting the fuel to the pinion port outlet; and
   a burner mounted proximate the wind machine, the burner for combusting the fuel from the pinion port outlet of the pinion port, and the fuel combusted to heat the air stream.

2. The heater apparatus of claim 1, wherein the fuel is received into the manifold in a substantially vaporized form.

3. The heater apparatus of claim 1, wherein the fuel is received into the manifold in a substantially liquified form.

4. A heater apparatus for a wind machine comprising:
   a central tower having a top,
   a wind machine rotatably mounted to the top of the central tower, the wind machine for generating an air stream;
   a housing immovably mounted to the central tower proximate the top of the central tower, the housing including a pinion cavity;
   a burner mounted to the central tower proximate the wind machine;
   a pinion received into the pinion cavity of the housing, the pinion mounted to the wind machine, and the pinion rotatable within the housing;
   a manifold formed in the pinion cavity, the manifold formed between the pinion and the housing, and the manifold further bounded by an upper seal and a lower seal;
   a fuel receivable into the manifold;
   a housing port through the housing, the housing port for conducting the fuel into the manifold;
   a pinion port through the pinion port for conducting the fuel to through the pinion; and
   a burner mounted proximate the wind machine, the burner for combusting the fuel from the pinion port, and the fuel combusted to heat the air stream.

5. The heater apparatus of claim 4, wherein the fuel is received into the manifold in a substantially vaporized form.

6. The heater apparatus of claim 4, wherein the fuel is received into the manifold in a substantially liquified form.

* * * * *

UNITED STATES PATENT AND TRADEMARK OFFICE
CERTIFICATE OF CORRECTION

PATENT NO. : 6,182,652 B1
DATED : February 6, 2001
INVENTOR(S) : Daryl G. Hill

It is certified that error appears in the above-identified patent and that said Letters Patent is hereby corrected as shown below:

<u>Column 3,</u>
Line 5, change "1Z" to -- 12 --.

Signed and Sealed this

Twenty-ninth Day of January, 2002

Attest:

JAMES E. ROGAN
*Attesting Officer*     *Director of the United States Patent and Trademark Office*